219-121 SR CROSS REFERENCE SEARCH ROOM
MTR04 XR 3,393,370 by

Inventor
Alvin W. Bauer
Paul A. Frank
His Attorney

Inventor
Alvin W. Bauer
by Paul A. Frank
His Attorney

Inventor
Alvin W. Bauer
by Paul A. Frank
His Attorney

MULTI-GEOMETRIC PATTERN ELECTRIC GENERATOR

Filed Aug. 4, 1965 5 Sheets-Sheet 4

Inventor
Alvin W. Bauer
by Paul A. Frank
His Attorney

| FUNCTION POT POSITION | Y-VOLTAGE | X-VOLTAGE |
|---|---|---|
| 12 | +8.66 | -5 |
| 2 | +8.66 | +5 |
| 6 | -8.66 | -5 |
| 8 | -8.66 | +5 |

| FUNCTION POT POSITION | Y-VOLTAGE | X-VOLTAGE |
|---|---|---|
| 12 | +10 | -8.66 |
| 5 | -10 | +8.66 |
| 8 | -10 | -8.66 |

NOTE
GAIN OF "X" AMPLIFIER IS SET LOWER THAN "Y" AMPLIFIER TO OBTAIN X COORDINATES OF ± 7.5 VOLTS

Inventor:
Alvin W. Bauer,
by Paul A. Frank
His Attorney.

United States Patent Office 3,393,370

Patented July 16, 1968

3,393,370

MULTI-GEOMETRIC PATTERN ELECTRIC GENERATOR

Alvin W. Bauer, Cincinnati, Ohio, assignor to General Electric Company, a corporation of New York Filed Aug. 4, 1965, Ser. No. 477,267
17 Claims. (Cl. 328—187)

ABSTRACT OF THE DISCLOSURE

Electrical circuit apparatus for generating X and Y-axis component electrical signals which determine any selected one of a plurality of predetermined geometric patterns. First and second plurality of series connected resistors form voltage divider networks for obtaining predetermined X and Y-axis coordinate voltages, respectively. Ganged function potentiometers rotate to generate the X and Y-axis component voltages for straight-line segments of the selected geometric pattern. A plurality of ganged multiposition switches interconnect the voltage divider resistors and function potentiometers for selecting the particular geometric pattern to be generated.

Figure 3:
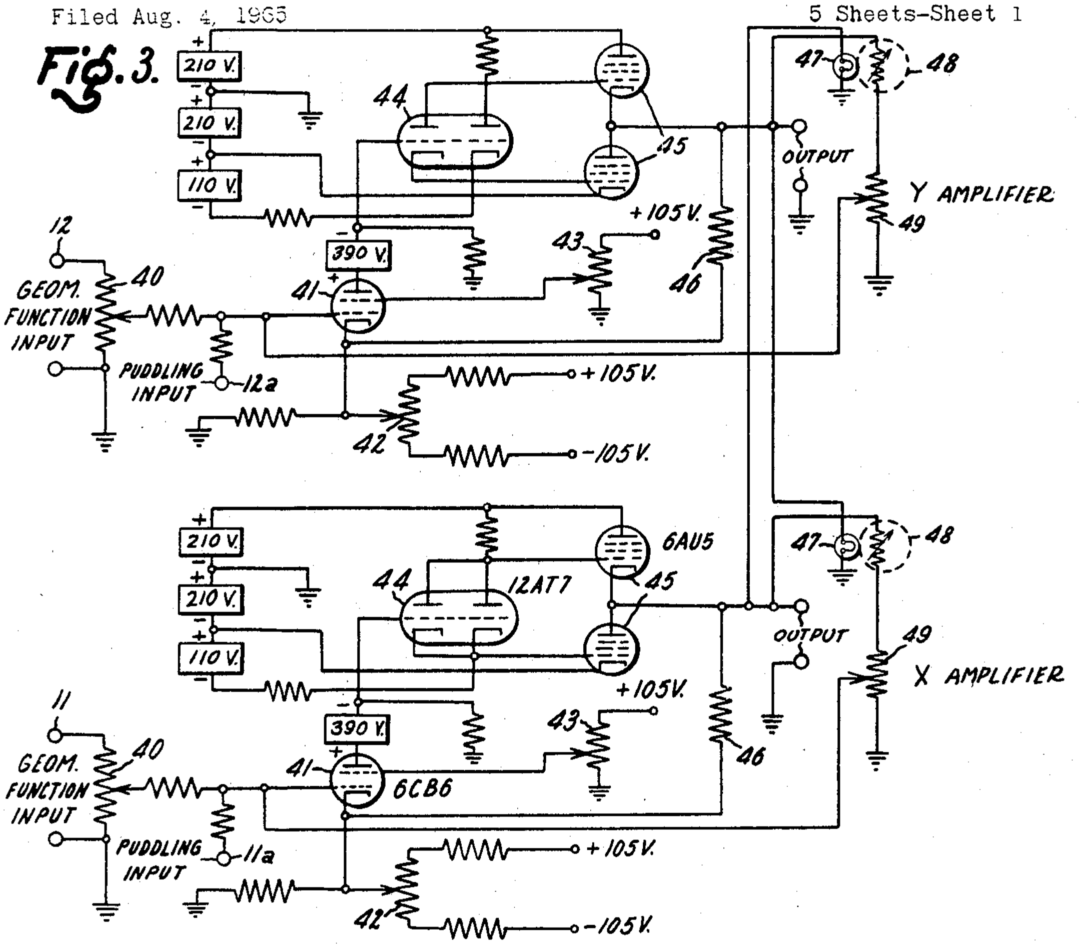

The electrical circuit apparatus when utilized in an electron beam welding apparatus may also be used with a puddling circuit providing X and Y-axis component voltages defining an amplitude modulated circular pattern for modifying the selected geometric pattern.

My invention relates to electrical circuitry apparatus associated with deflection coils of electron beam devices, and in particular, to improvements in the electrical circuits which generate and amplify electrical signals for controlling the movement of an electron beam in selected patterns on a workpiece being processed thereby.

Electron beam machines, as they are now conventionally described, are devices which generate a highly focussed beam of electrons, which beam may be utilized to process a material being irradiated thereby such as in welding, brazing, melting and cutting. Electron beam machines, and in particular, electron beam welders, are operated to direct a generated electron beam at a selected point or along a selected path (pattern) on the material being irradiated. The direction and motion of the electron beam may be controlled by beam deflecting coils. A first pair of such coils providing deflection of the beam in a first (X-axis) direction and a second pair providing deflection in a second direction orthogonal to the first (i.e., the Y-axis direction), the X and Y axes conventionally defining a plane perpendicular to the electron beam axis.

The electrical circuit apparatus which supplies electrical control signals to the electron beam machine deflection coils includes components that may be described as a pattern generator and direct current (D.C) power amplifier. The pattern generator provides electrical signals characteristic of the pattern to be defined by the electron beam on the irradiated material, and the D.C. amplifier amplifies the normally low level power output of the pattern generator to a magnitude sufficient to adequately energize the deflection coils. Prior to my invention, no known electron beam machines, and in particular electron beam welders, provided a means for automatically generating any selected geometric (welding) pattern. All prior known devices rely upon mechanical control to produce the X–Y axis electrical control signals which, when supplied to the deflection coils, produce the desired geometric (weld) pattern.

Therefore, one of the principal objects of my invention is to provide an electrical circuit apparatus for automatically controlling the motion of an electron beam in a desired geometric pattern.

Another object of my invention is to provide electrical circuitry for obtaining a selected one of a plurality of predetermined patterns.

A further object of my invention is to provtide a pattern generator with control of speed of generation of the pattern including stopping and reversal of direction.

The D.C. power amplifiers (as distinguished from D.C. voltage amplifiers) which are employed to amplify the electron beam pattern signals, and D.C. power amplifiers in general, prior to my invention have not been capable of providing a high power output with an essentially flat response over a reasonably wide frequency range. This characteristic is desirable to obtain accurate and consistently reproducible welding patterns.

Therefore, a further object of my invention is to provide a direct current power amplifier having a relatively high power output with a flat response over a desired operating frequency range.

A still further object of my invention is to provide such amplifier with means to correct for nonlinearity in electron beam machine deflection coils.

Electron beam welding machines produce electron beams of very small diameter, and in order to produce a weld of high quality a "puddling" technique is generally used wherein is obtained a slight controlled excursion of the electron beam from a fixed location (in the case of spot welds) or path of impingement on the workpiece being processed. Known puddling techniques establish small circular patterns of a fixed and unvarying size.

Therefore, another object of my invention is to provide a puddling circuit in the pattern generator wherein a puddling action can be made variable and controlled in size.

A further object of my invention is to provide amplitude modulation of the puddling action.

Briefly stated, and in accordance with my invention, I provide an electrical circuit apparatus for generating X and Y-axis component electrical signals which determine any selected one of a plurality of predetermined geometric patterns. The apparatus includes a regulated direct current power supply across which are connected a first and second plurality of series connected resistors to form voltage divider networks for obtaining predetermined X and Y-axis coordinate voltages, respectively. A three-gang multitap function potentiometer which may be automatically rotated in either direction at selected speeds generates the X and Y-axis component voltages required to produce a selected geometric pattern. A first of the multitap function potentiometers provides as an output the X-axis component voltage, and the second potentiometer provides the Y-axis component voltage for a selected straight-line segmented geometric pattern. The third function potentometer comprises a sine-cosine potentiometer which provides X and Y-axis component voltages for generating a circular pattern. The number of taps on the first and second function potentiometers determine the maximum number sided figure that may be generated. A plurality of ganged multiposition switches are operated for selecting the particular geometric pattern to be generated. The multiposition switches interconnect the voltage divider resistors and the function potentiometers to supply the coordinate voltages selected from the voltage divider network to appropriate taps of the associated function potentiometers whereupon rotation thereof generates the X and Y-axis component voltages defining the selected geometric pattern as determined by the position setting of the multiposition switches.

For welding purposes, a circuit associated with the pattern generator provides electrical signals that cause controlled small excursions of an electron beam from the path determining a selected welding pattern. This latter "puddling" circuit obtains sine-cosine functions of an alternating current voltage which are combined in a dual D.C. power amplifier circuit with the X and Y-axis component voltages of the geometric pattern. The resultant pattern produced by the pattern generator and puddling circuit is the selected geometric pattern modified by very small excursions therefrom, the excursions comprising a circular motion superimposed on the motion defining the selected pattern. The amplitude (diameter of puddling circle) of the puddling output can be varied by a gain control and the puddling output can also be amplitude modulated (to dilate and contract the puddling circle) over a selected frequency range at any desired percent of modulation by means of multivibrator oscillator.

A dual D.C. power amplifier is coupled to the X and Y-axis outputs of the pattern generator and puddling circuit. The amplifier combines and amplifies such signals for utilization thereof by the deflection coils of an electron beam machine. The amplifier is provided with a circuit for correcting nonlinearity common to many electron beam deflection coils and provides a relatively high power output with a flat response over the frequency operating range of the pattern generator.

Figure 1:
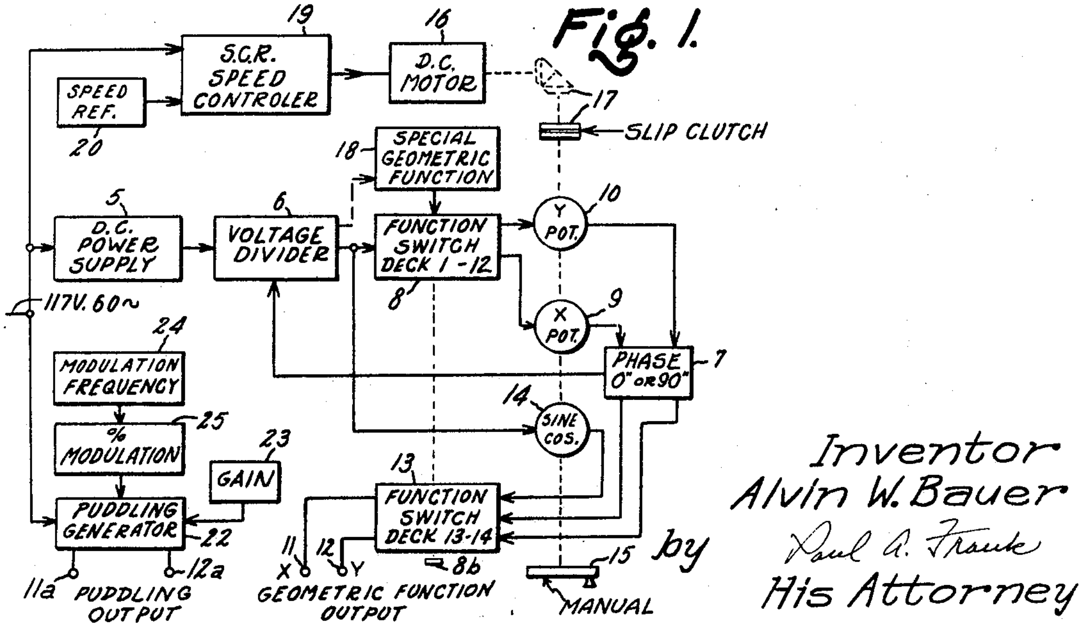
Figure 2A:
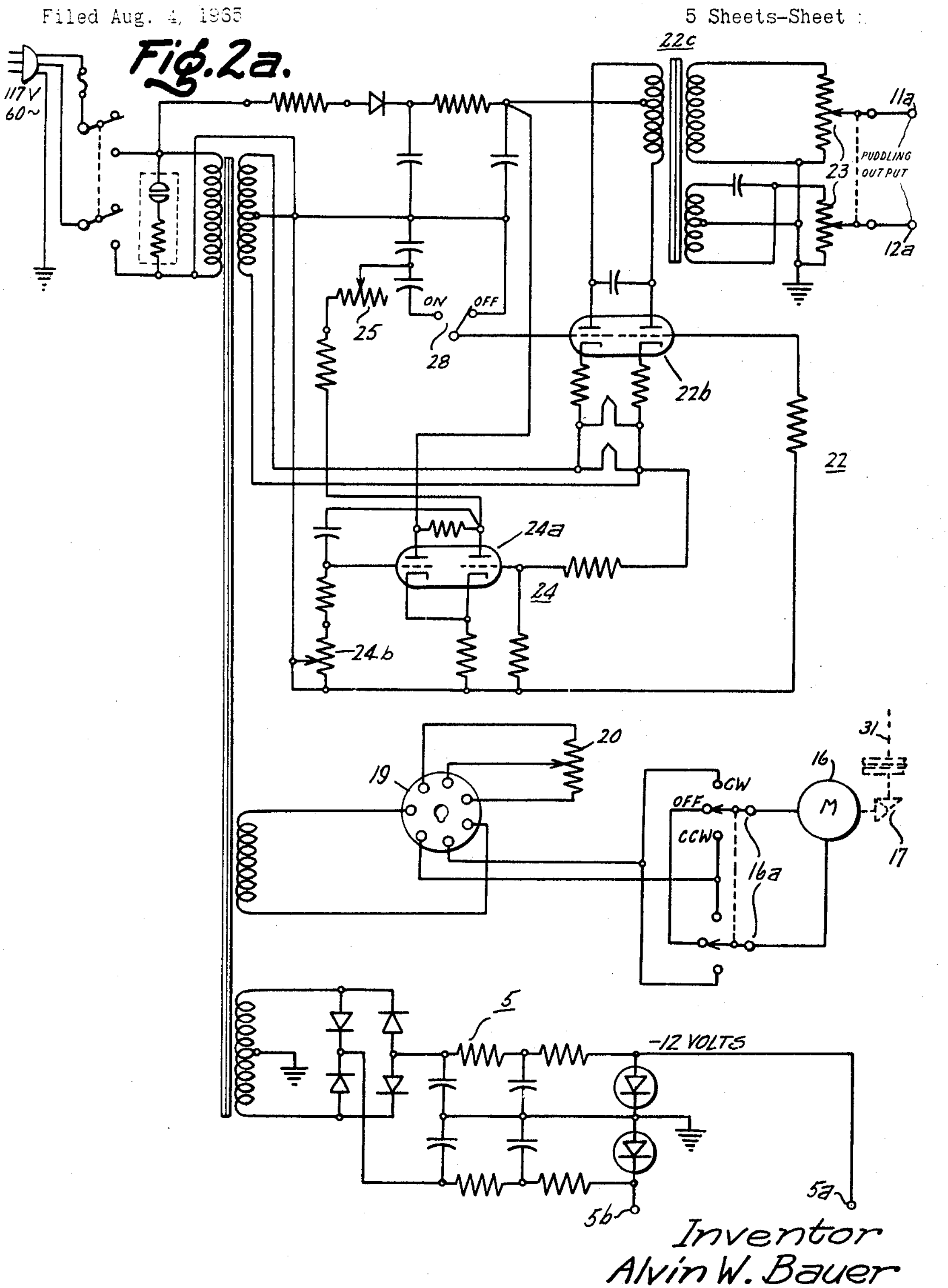
Figures 2B, 2D:
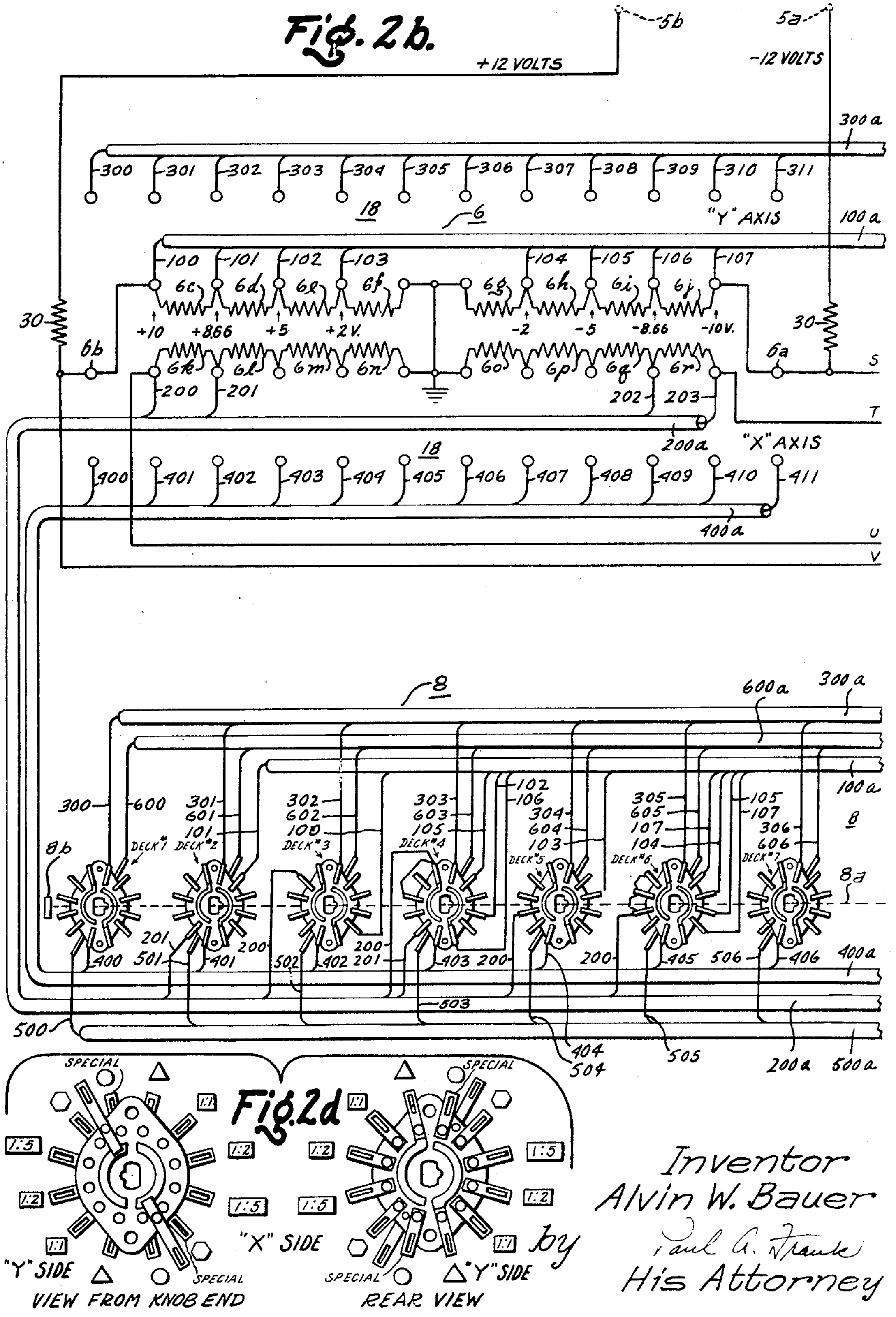
Figures 2C, 2E:
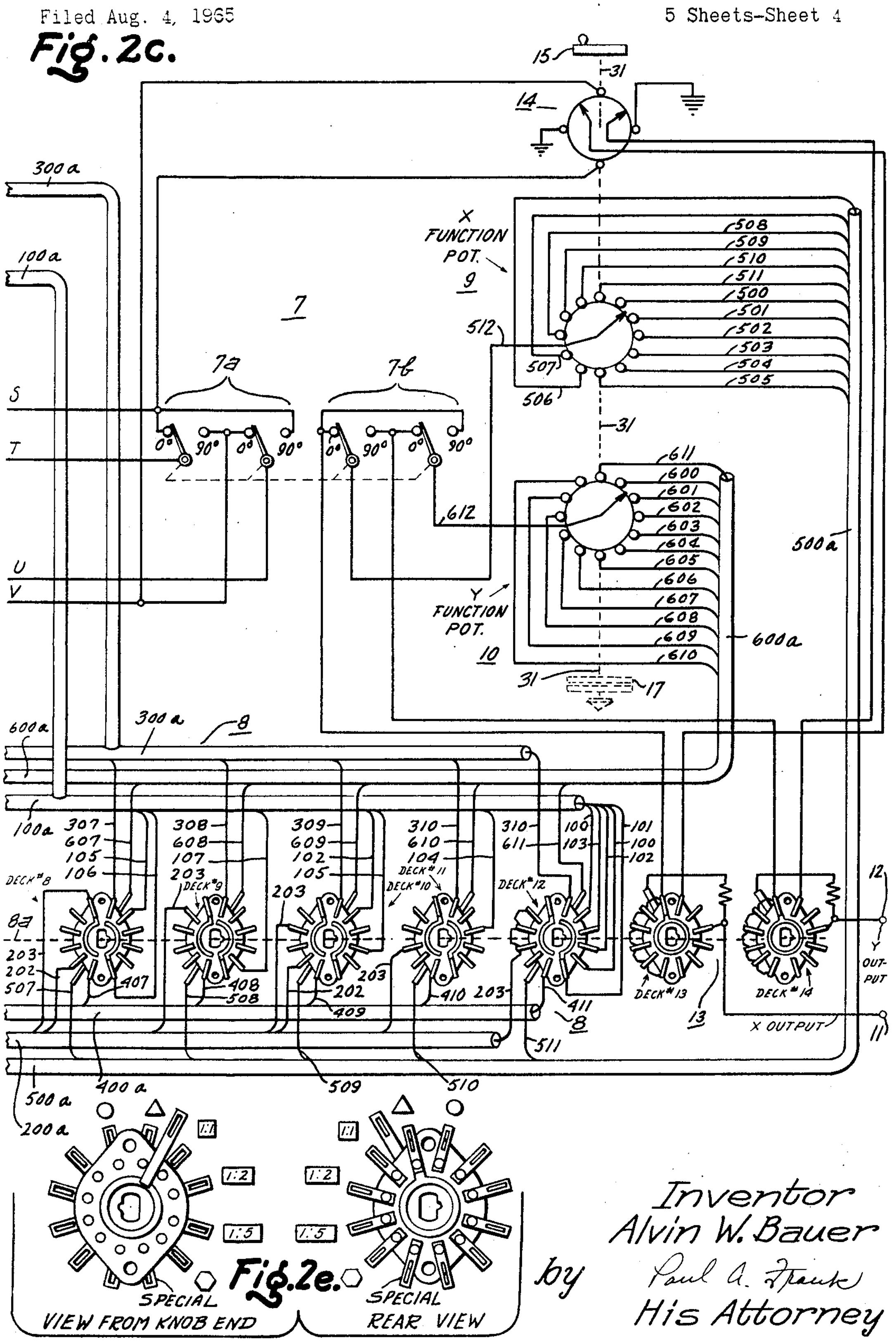
Figure 4A:
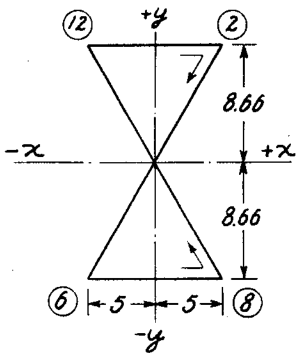

The features of my invention which I desire to protect herein are pointed outwith particularity in the appended claims. The invention itself, however, both as to its organization and method of operation, together with further objects and advantages thereof, may best be understood by reference to the following description taken in connection with the accompanying drawings wherein like parts in each of the several figures are identified by the same reference character and wherein:

FIGURE 1 is a block diagram of the pattern generator and associated puddling circuit:

FIGURES 2*a, b, c* are a detailed schematic circuit diagram of the pattern generator and puddling circuit;

FIGURES 2*d* and 2*e* are views of the function switches (deck 1–12) and deck (13–14), repectively, of FIGURE 1;

FIGURE 3 is a simplified schematic diagram of the dual D.C. power amplifier; and FIGURES 4*a, b* are examples of two special geometric patterns that can be generated by the pattern generator.

Referring now to FIGURE 1, there is shown in block diagram form a multi-geometric pattern electric generator and associated puddling circuit constructed in accordance with my invention. The pattern generator includes a conventional regulated direct-current power supply 5 for generating direct current power at a substantially constant voltage. The input to the power supply is provided from a source of alternating current power, herein indicated as a 117 volt, 60 c.p.s. source. A voltage divider network 6 is connected across the output of power supply 5. The voltage divider network includes a first plurality of series connected resistors which provide voltages representing predetermined positive and negative Y-axis coordinate voltages. Voltage divider network 6 further includes a second plurality of series connected resistors which provide the X-axis coordinate voltages. The X-axis resistors are connected to the output of power supply 5 through a first section of 0°–90° phase shift switch 7 to be hereinafter described, the phase shift switch providing a reversal of polarity of the output voltage of power supply 5 across the X-axis resistors. Tap points of the voltage divider network 6 are connected to selected contacts of a function switch 8, a plurality (decks 1–12) of ganged multi-position wafer switches wherein each position supplies predetermined of the X and Y-axis coordinate voltages to particular tap points of ganged linear X-axis function potentiometer 9 and Y-axis function potentiometer 10, respectively. Each position of function switch 8 thus supplies all of the coordinate voltages for a particular geometric pattern to be generated, the switch being manually operable for selection of the particular desired pattern. The X and Y function potentiometers 9, 10 are provided with equally spaced-apart tap points such that rotation of the ganged function potentiometers generates sequentially the voltages representing X and Y-axis component voltages to obtain sequential straight-line segments of the selected geometric pattern. The length of each straight-line segment voltage component is directly proportional to the electric potential existing between adjacent potentiometer tap points having voltages supplied thereto, it being understood that all of the tap points need not be supplied with voltages as described in detail hereinafter.

The output of X and Y-axis function potentiometers 9 and 10 is connected to a second section of 0°–90° phase shift switch 7 such that in the 0° position, the X and Y-axis component voltages are connected to associated X and Y output terminals 11 and 12 through an output function switch 13 (decks 13, 14) ganged with function switch 8, in the 90° position the voltages are reversed and connected to the Y and X output terminals, respectively to thereby rotate the geometric pattern by 90°. The X and Y function potentiometers 9, 10 are employed to generate noncircular (i.e. straight-line segmented) geometric patterns such as an equilateral triangle, hexagon, square, or rectangular with sides having a length ratio of 1:2 or 1:5. Function switch 8 is also provided with a position marked "SPECIAL" for generating noncircular (straight-line segmented) geometric patterns other than the hereinbefore described. A circuit 18 provides the necessary coordinate voltages for developing the X and Y-axis component voltages associated with the special pattern. A circular geometric pattern is obtained by manually operating ganged function switch 8, 13 into a selected position wherein the output of a sine-cosine function potentiometer 14 is connected to output terminals 11, 12 by means of output function switch 13.

The X, Y function potentiometers and sine-cosine potentiometer are ganged and rotated either manually by means of knob 15 or automatically by a motor drive which includes a direct current motor 16 and a slip clutch and gear combination 17. The direct current motor 16 can be controlled to rotate at any speed within a predetermined operating range in either direction by means of a conventional speed control circuit 19 having a speed selector control 20. The X and Y-axis function potentiometers 9, 10 and the sine-cosine potentiometer 14 may thus be automatically rotated by a motor drive and there is a manual take-over by manipulation of knob 15 to cause the slip clutch to disengage the motor drive.

A puddling circuit is associated with the pattern generator to provide controlled small excursions of an electron beam from the normally circular or straight-line defined by the beam motion on the workpiece. The puddling circuit includes a puddling generator 22 having the outputs 11*a*, 11*b* thereof representing X and Y-axis component voltages generating a circular pattern at the power line frequency. The puddling output, when combined with the geometric function output from output function switch 13, provides a semi-cycloidal pattern wherein the geometric patterns generated by X and Y-axis function potentiometers 9, 10 and the circular pattern generated by sine-cosine potentiometer 14 are modified by the circular puddling output to produce a "spinning" electron beam, it being understood that the diameter of the puddling circle is very small relative to a diameter or diagonal of the generated pattern. The particular size of the puddling circle can be varied by a gain control 23. Further, the puddling circle can be amplitude modulated by a circuit 24 which modulates the circular motion at a selected frequency within an adjustable frequency range by means of control 24*a*. The modulation causes an undulation (contraction and dilation) of the puddling circle which is useful in the reduction of a porosity in partial penetration welds. A control 25 can be employed to control the percent of amplitude modulation.

Referring now to the detailed schematic diagram of the pattern generator and puddling circuit in FIGURES 2*a*, *b*, *c*, the direct current power supply 5 shown in block diagram form in FIGURE 1 is illustrated in FIGURE 2*a* as a conventional full-wave power supply provided with resistor-capacitor filter networks and having a Zener diode controlled output at terminals 5*a* and 5*b*. A specific embodiment of my invention, not to be considered as a limitation thereof, supplies the direct current power at a potential of 24 volts across terminals 5*a* and 5*b* (−12 volts at terminal 5*a* +12 volts at terminal 5*b*). Voltage dropping resistors 30 in FIGURE 2*b*, connected between the output terminals 5*a*, 5*b* of the power supply and the terminals 6*a*, 6*b*, of the voltage divider networks 6 on FIGURE 2*b*, obtain the particular 20 volt potential across the voltage divider networks 6 as required in the herein described specific embodiment of my invention. Voltage divider 6 includes a first series connection of resistors 6*c* through 6*j*, each resistor being of a selected resistance to obtain a predetermined voltage drop thereacross. The voltages at the tap points of resistors 6*c* through 6*j* represent Y-axis coordinate voltages. In my specific embodiment, the particular Y-axis coordinate voltages existing at the tap points shown connected to electrical conductors 100 through 107 are +10, +8.66, +5, +2, −2, −5, −8.66 and −10 volts, respectively. A Y-axis coordinate voltage of zero volts is also provided. Electrical conductors 100 through 107 are formed into a cable 100*a*, the other end of each conductor being connected to one or more selected contacts on the "Y side" of a plurality (decks 1–12) of multiposition rotary switches designated as the function switch 8 in FIGURE 1. In like manner, a second series connection of resistors 6*k* through r obtain X-axis coordinate voltages at the tap points thereof. In my specific embodiment only four X-axis coordinate voltages +10, +8.66, −8.66, −10 volts (and zero volts) are employed. In the SPECIAL position of switch 8, the remaining X-coordinate voltages can be utilized. The X-axis voltage divider tap points are connected to electrical conductors 200 through 203 which are formed into cable 200*a*, the other end of each conductor being connected to one or more selected contacts on the "X side" of function switch 8.

The twelve (deck 1–12) wafer switches forming function switch 8, and the two (deck 13–14) wafer switches forming function switch 13 are each mechanically coupled to a common shaft 8*a* and this ganged arrangement of switches is rotated together as one unit by manual rotation of pattern selector knob 8*b* connected to the shaft. Each switch comprising function switch 8 is divided into two segments (sides), one segment representing the X-axis side and the other segment the Y-axis side. The details of each rotary switch comprising function switch 8 are illustrated in an enlarged front (view from knob end 8*b*) and rear view of one such switch in FIGURE 2*d*. Thus, each switch of function switch 8 is a two-pole, six-position switch. The X and Y-axis side designations for the two segments of each switch are indicated in FIGURE 2*d*. Each of the six positions on the X and Y-axis side of the switches represents a particular geometric pattern that may be generated by the function generator. As illustrated in the six positions of the switch in FIGURE 2*d*, in my specific embodiment employing the aforementioned voltage divider networks, an equilateral triangle, hexagon, square, and rectangles having a side length ratio of 1:2 and 1:5 may be obtained; a circle may be generated by utilizing a sine-cosine function potentiometer as hereinafter described. Further, a switch position which provides the circle may also be employed to generate a "SPECIAL" noncircular (straight-line segmented) geometric pattern resulting from the utilization of coordinate voltages supplied to (Y-axis) conductors 300 through 311 and (X-axis) conductors 400 through 411 from the X and Y-axis internal voltage divider 6 or from an external bipolarity direct current multivoltage source (not shown). Conductors 300–311 are formed into a cable 300*a*, and conductors 400–411 into cable 400*a*, the other ends of the conductors being connected to selected contacts on the Y and X-axis side, respectively (of decks 1–12) of function switch 8.

It should be noted that the twelve rotary switches of function switch 8 are illustrated from the rear view and are in the position to generate an equilateral triangle. The side length ratios of the 1:2 and 1:5 rectangles represents the ratio of the Y-axis to X-axis components when switch 7 is in the 0° position. When this switch 7 is in the 0° position, all geometric figures are generated as shown in FIGURE 2*d*. When switch 7 is in the 90° position, all straight-sided figures are oriented 90° clockwise rotation from the position shown in FIGURE 2*d*. Sections 7*a* and 7*b* of switch 7 comprise a pair of ganged, two-pole, two-position switches. In the 0° position of switch section 7*a*, resistors 6*k* through 6*r* of the X-axis voltage divider network 6 are connected across the power supply output terminals 5*a*, 5*b* in the same manner as resistors 6*c* through 6*j*. However, in the 90° position of switch section 7*a*, the series connection of resistors 6*k* through 6*r* is reversed with respect to the output terminals 5*a*, 5*b*. This reversal of connection of the X-axis voltage divider resistors across the power supply permits the generation of the electron beam geometric pattern in the same direction (clockwise or counterclockwise) regardless of whether the geometric patterns are rotated by 90° or not. As hereinabove described, function switch 8 includes twelve (decks 1–12) ganged two-pole, six-position rotary switches in the herein described specific embodiment of my invention. For convenience of illustration, seven (decks 1–7) of these switches are illustrated on FIGURE 2*b* and the remaining five (decks 8–12) are illustrated on FIGURE 2*c*.

The coordinate voltages for each selected geometric pattern are transmitted from the X and Y-axis side of function switch 8 via cables 500*a* and 600*a*, respectively, to the proper tap on the X and Y-axis function potentiometers 9 and 10 illustrated in FIGURE 2*c*.

The X and Y-axis function potentiometers 9, 10 are linear potentiometers adapted for 360° rotation, having no mechanical stops, and in my specific embodiment each comprise a twelve-tap linear potentiometer wherein the tap points are equally displaced at 30° angles. The twelve tap points of the X-axis function potentiometer 9 are connected to associated contacts (as determined by the position of pattern selector knob 8*b*) on the X-axis sides of the twelve decks comprising function switch 8 by means of conductors 500 through 511 which are formed into cable 500*a*. In like manner, the twelve tap points of Y-axis function potentiometer 10 are connected to associated contacts on the Y-axis side of the twelve decks by means of conductors 600 through 611 which are formed into cable 600*a*. The X and Y-axis function potentiometers 9 and 10, and a sine-cosine function potentiometer 14 to be hereinafter described are all mechanically coupled to a single shaft 31 which can be manually rotated by means of knob 15 or can be automatically rotated through a slip clutch and gear arrangement 17 by means of an electric motor 16 illustrated in FIGURE 2*a*. Shaft 31 may be rotated in either direction and the X and Y-axis component voltages are extracted therefrom by means of conductors 512 and 612 connected to the respective rotatable contacts on the potentiometers. It can be appreciated that the rotation of the contacts on function potentiometers 9 and 10 generate the X and Y-axis component voltages of straight-line segmented geometric patterns having a number of sides determined by the number of coordinate voltages supplied to the tap points of the two function potentiometers. Thus, a noncircular geometric pattern having a maximum number of twelve straight sides may be obtained by rotating knob 8*b* to the "SPECIAL" position of function switch 8 and supplying suitable voltages to conductors 300 through 311 and 400 through 411 from the X and Y-axis voltage dividers 6 or from an external multivoltage electric power source (not shown). It can be appreciated that in the general case, the length (magnitude) of any axis component of a side of the generated geometric pattern is directly proportional to the electric potential existing across the portion of the linear function potentiometer being traversed by the moving contact thereof. In the general case (not including the twelve-sided figure) only selected taps of the twelve tap points of each function potentiometer will have coordinate voltages supplied thereto, the particular tap points supplied being determined by the geometric pattern selected. The linear resistance of the function potentiometers 9 and 10 obtains straight lines, for the sides of any geometric patterns being generated thereby. As an example, with the function switch 8 in the position illustrated (to form an equilateral triangle) Y-axis coordinate voltages of −8.66, −8.66, +8.66 volts are utilized, being transmitted from the Y-axis voltage divider network via conductors 106, 101 and decks 4, 8, 12 to the particular tap points on the Y-axis function potentiometer 10 identified by conductors 603, 607, 611, respectively. In like manner, the X-axis component voltages for the equilateral triangle are determined from the X-axis coordinate voltages +10, −10 volts which are transmitted to the particular tap points on the X-axis function potentiometer 9 identified by conductors 503, 507, respectively.

Figure 4B:
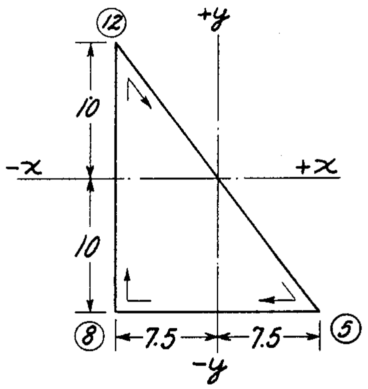

The X and Y-axis coordinate voltages associated with particular tap points on potentiometers 9, 10 are illustrated in FIGURES 4*a*, 4*b* for the SPECIAL geometric patterns of a double-triangle and a 3–4–5 triangle. The indicated tap points 2, 5, 6, 8, 12 (function pot. position) correspond to the numbering system on a clock. In the case of the 3–4–5 triangle in FIGURE 4*b*, the X-axis coordinate voltages +7.5, −7.5 may be obtained by setting the "X amplifier" gain 40 lower than the "Y amplifier" gain (see FIGURE 3) and thereby reducing the effect of the 8.66 volts to 7.5 volts, or by employing an external ±7.5 voltage source.

The sine-cosine function potentiometer 14 in FIGURE 2*c* is employed to generate circular geometric patterns. Potentiometer 14 is connected across the 10 volt power supply terminals 6*a*, 6*b* in FIGURE 2*b* via conductors S, V and the two potentiometer outputs are connected to fixed contacts of the two output switches (decks 13, 14) identified as function switch 13 in FIGURE 1. These latter two output switches comprise one-pole, twelve-position rotary switches as illustrated in FIGURE 2*e*, the output of deck 13 supplying the X-axis geometric function component voltage and the output of deck 14 supplying the Y-axis component voltage at terminals 11 and 12, respectively. The resistors connected in the output contact circuits of decks 13, 14 prevent damage (by overheating) to the function potentiometers 9, 10, 14, in the case of accidental short-circuiting in the vicinity of the output terminals 11, 12. It may also be noted that the output conductors 512 and 612 of potentiometers 9 and 10, respectively, are connected to the 7*b* section of 0°–90° phase shift switch 7 in such a manner that in the 0° position, the X and Y-axis component voltages are transmitted to the respective X and Y-axis output switches, deck 13 and deck 14, whereas in the 90° position the X and Y-axis signals are transmitted to deck 14 and deck 13, respectively, thereby generating a straight-line segmented geometric pattern which is oriented (rotated) 90 degrees from the one generated with switch 7 in the 0° position.

The three rotary function potentiometers can be rotated automatically by a motor drive or manually as hereinabove described. In the automatically driven position, a selector switch 16*a*, illustrated in FIGURE 2*a* is operated to choose the desired direction of rotation clockwise (CW) or counterclockwise (CCW). A conventional speed control circuit 19 is provided to maintain a speed regulation of approximately 1%. The motor speed may be varied to obtain a speed of geometric pattern generation continuously variable from zero to 60 cycles per minute in the specific embodiment of my invention by varying speed reference potentiometer 20 associated with the speed control circuit.

The basic embodiment of my puddling circuit as shown on FIGURE 2*a* comprises a puddling generator circuit 22 which has the cathode circuit of an output tube 22*b* operating from the 60 cycle per second power line frequency. The output tube 22*b* has an output transformer 22*c* with two secondary windings, one of which has a 90° phase shift circuit. The outputs of the transformer secondaries can be varied by puddling output control 23. In the absence of modulation of the puddling signals, the puddling outputs at terminals 11*a*, 12*a* comprise two 90° phase displaced 60 cycle per second carrier frequency signals which generate a circular pattern.

The 60 cycle puddling output signal can be modulated with multivibrator circuit 24 by operating a selector switch 28 into the "ON" position. Switch 28 in the "ON" position supplies an amplitude modulation signal comprised of a selected submultiple of the 60 cycle per second frequency to the grid circuit of output amplifier 22*b*. The percent of the amplitude modulation is adjustable by variation of rheostat 25 connected between the plate of tube 24*a* and the grid of 22*b*. The particular submultiple of 60 cycle frequency selected for amplitude modulation of the 60 cycle carrier is determined by adjustment of potentiometer 24*b* in the grid circuit of tube 24*a*. Modulation frequencies of 30, 20, 15, 12, 10 and 8 cycles per second may be obtained in my specific embodiment. The gain (diameter of puddling circle) can be varied to a maximum of approximately ⅜ inch diameter by adjustment of ganged potentiometers 23.

The dual D.C. power amplifier illustrated in simplified schematic form in FIGURE 3 combines and amplifies the output of the pattern generator and puddling circuit and supplies the required electric power for the X and Y deflection coils of an electron beam machine such as a welder. The dual D.C. power amplifier includes two identical circuits, the first (X amplifier) providing amplification of the X-axis component voltage obtained from the X-axis function output terminal 11 in FIGURE 2*c*, and the puddling output obtained from terminal 11*a* in FIGURE 2*a*. The second circuit (Y amplifier) obtains amplification of the Y-axis component voltage obtained from output terminal 12 in FIGURE 2*c*, and the puddling output obtained from terminal 12*a* in FIGURE 2*a*. The geometric function component and puddling component voltages are respectively supplied to the input terminals 11, 12 and 11*a*, 12*a* of the amplifier circuits. The geometric function input terminals 11, 12 also have connected thereacross a potentiometer 40 for establishing the power gain of the associated power amplifier thereby determining the size of the geometric shape selected. The cathode circuit of voltage amplifier stage 41 includes a potentiometer 42 which biases the voltage amplifier and functions as a centering control to adjust the centerline (in the X or Y-axis directions) of the geometric pattern being generated. The screen grid circuit of voltage amplifier 41 includes a potentiometer 43 which functions as a zero setting to correct for variations in characteristics of the tube or tube circuit resistors. The output of the voltage amplifier circuit is connected to the input of a phase inverter and amplifier circuit 44. The output of circuit 44 is connected to the input of a class B push-pull power amplifier stage 45. The D.C. power amplifier output is obtained from the juncture of the cathode and plate of the two tubes comprising the power amplifier stage 45. A negative feedback circuit including resistor 46 is connected from the output of the power amplifier stage to the cathode circuit of the voltage amplifier 41 to provide increased circuit stability. The D.C. power amplifier includes potentiometer 49 and a light bulb 47—photoresistive cell 48 circuit connected in criss-cross fashion at the output of each amplifier to minimize distortion of the geometric pattern due to nonlinearity common to many electron beam machine deflection coils. The use of this linearity compensation (correction) circuit permits maximum geometric pattern generation speeds of 100 cycles per minute. The puddling speed is not limited by the linearity correction circuit, therefore a maximum puddling speed of 1000 cycles per second may be used, if desired, by having the puddling generator 22 operate at a 1000 c.p.s. carrier frequency. With proper choice of electron beam machine deflection coils having no nonlinearity, the effect of the linearity correction circuit may be removed by setting potentiometer 49 to zero potential and the dual D.C. power amplifier then has a 1000 c.p.s. frequency response for both pattern generation and puddling. The particular D.C. voltages indicated in FIGURE 3 supply the proper potentials across the associated tubes and resistors in the specific embodiment of my invention and are not to be construed as a limitation. The power gain of each amplifier is 50 decibels and the maximum power output of each amplifier is 100 volts$\pm$100 volts at $\pm$100 milliamperes for the particular output tube type 6AU5 indicated. Higher power outputs can readily be obtained by paralleling additional output tubes or selecting different circuit components. The regulation of the power amplifier is in the order of 1 to 2% in the power output for a $\pm$20% change in line voltage. Any power output desired within the range zero to the maximum for the particular tube types employed can be obtained by proper adjustment of potentiometers 40 at an essentially flat frequency response in the frequency ranges described with essentially no phase shift within this frequency range. This power output is linearly adjustable over the range $-100$ to $+100$ volts. The input to the D.C. power amplifier may be disconnected from the normal inputs thereto, and reconnected to a source of constant D.C. voltage, the amplifier then operating as a regulated D.C. power supply continuously variable from $-100$ volts to $+100$ volts. It may be noted that my dual D.C. power amplifier does not require the regulated power supply used in conventional D.C. amplifiers since the circuit is self-stabilizing.

From the foregoing description, it can be appreciated that my invention attains the objectives set forth and makes available a new multi-geometric pattern electric generator for controlling the deflection of an electron beam or any other uses wherein the X and Y-axis component voltages of a selected geometric pattern are required. The generation of geometric pattern may be accomplished automatically or manually, the speed of generation is controllable, and the drive may be reversed, if desired, to obtain a backing-up effect. Patterns having maximum diagonal dimensions of approximately three inches may be readily generated with my apparatus. The particular size of the pattern depends on characteristics such as the electron beam machine accelerating voltage, distance between workpiece and electron beam gun, and the particular deflection coils used. A puddling circuit is also provided for obtaining controlled small circular excursions of the electron beam from the path determined by the pattern generator. The puddling output may be amplitude modulated at a selected modulating frequency and at a controlled percent of modulation. The output of the pattern generator (and puddling circuit) is amplified by an improved dual D.C. power amplifier circuit which provides a higher power output linearly adjustable over the range $-100$ to $+100$ volts with an essentially flat frequency response not possible with any presently known D.C. power amplifiers. The 0–100 cycle capability of the amplifier permits linear generation of the geometric patterns over the range $-100$ to $+100$ volts.

Having described a specific embodiment of my pattern generator, puddling circuit and D.C. power amplifier, it is believed obvious that modification and variation of my invention is possible in the light of the above teachings. Thus, a greater or lesser number of selected geometric patterns may be generated by employing a greater or lesser number of (1) coordinate voltages associated with voltage divider networks 6, and, or (2) decks of switches in function switch 8, and, or (3) equally spaced tap points on linear X and Y-axis function potentiometers 9 and 10. Further, the particular geometric patterns hereinabove described may be modified to be nonsymmetrical, if desired, by unequal adjustment of the power amplifier gain controls 40. Geometric patterns of virtually any shape may be generated by turning selector knob **8*b* into the "SPECIAL" position and providing suitable coordinate voltages to conductor 300–311 and 400–411**. Further, the illustrated variable resistor means for varying the percent and frequency of modulation in the pudding circuit may comprise other known circuit components for obtaining these results. Finally, the puddling circuit carrier frequency may be generated by a second oscillator, if desired, especially in the case wherein the carrier frequency is other than the power line frequency.

It is, therefore, to be understood that changes may be made in the particular embodiment as described which are within the full intended scope of my invention as defined by the following claims.

What I claim as new and desire to secure by Letters Patent of the United States is:

1. A multi-geometric pattern electric generator comprising first electrical circuit means for generating a plurality of predetermined X and Y-axis coordinate voltages, multi-connection second electrical circuit means for generating X and Y-axis component voltages which determine a plurality of predetermined geometric patterns, said second electrical circuit means comprises two multi-tap linear potentiometers having taps at equally spaced points, said two potentiometers mechanically coupled to a common shaft for ganged operation whereby rotation thereof generates the X and Y-axis component voltages determining straight-line segmented geometric patterns, and switching circuit means for transmitting the X and Y-axis coordinate voltages to selected connections in said second electrical circuit means to thereby provide selection of a particular one of the plurality of geometric patterns to be generated.

2. The multi-geometric pattern generator set forth in claim 1 and further comprising a dual direct-current power amplifier circuit for amplifying the power level of the X and Y-axis component voltages, and means connected in the output of said power amplifier circuit for compensating for nonlinearity in the load of said dual amplifier circuit.

3. The multi-geometric pattern generator set forth in claim 1 wherein said second electrical circuit means further comprises a sine-cosine function potentiometer mechanically coupled to said common shaft whereby rotation thereof generates X and Y-axis component voltages determining a circular pattern, and said switching circuit means further includes means for alternatively connecting the X-axis component voltages determining the straight-line segmented patterns and the circular pattern to a first output terminal for utilization thereof, and for alternatively connecting the Y-axis component voltages determining the straight-line segmented patterns and the circular pattern to a second output terminal for utilization thereof.

4. The multi-geometric pattern generator set forth in claim 3 and further comprising phase shift switching means interconnecting the outputs of said two linear potentiometers and said output terminals whereby in a first position of said phase shift switching means the X and Y-axis component voltages determining the straight-line segmented patterns are respectively connected to said first and second output terminals, and in a second position of said phase shift switching means the connections are reversed to thereby obtain a 90° rotation in the straight-line segmented pattern to be generated.

5. A multi-geometric pattern electric generator comprising first electrical circuit means for generating a plurality of predetermined X and Y-axis coordinate voltages, multi-connection second electrical circuit means for generating X and Y-axis component voltages which determine a plurality of predetermined geometric patterns, and switching circuit means for transmitting the X and Y-axis coordinate voltages to selected connection in said second electrical circuit means to thereby provide selection of a particular one of the plurality of geometric patterns to be generated, said switching circuit means comprises a plurality of multi-position switches mechanically coupled to a common shaft for ganged operation thereof, each position of said switches corresponding to a particular geometric pattern to be generated.

6. A multi-geometric pattern electric generator comprising first electrical circuit means for generating a plurality of predetermined X and Y-axis coordinate voltages, said first electrical circuit means comprises means for supplying direct current electric power at a relatively constant voltage, a first plurality of series connected resistors connected across said power supply means to form a first voltage divider network for generating the X-axis coordinate voltages, a second plurality of series-connected resistors connected across said power supply means to form a second voltage divider network for generating the Y-axis coordinate voltages, multi-connection second electrical circuit means for generating X and Y-axis component voltages which determine a plurality of predetermined geometric patterns, said second electrical circuit means comprises two multi-tap linear potentiometers having taps at equally spaced points, a sine-cosine function potentiometer mechanically coupled to a first common shaft for ganged operation thereof whereby rotation of said linear potentiometers generate X and Y-axis component voltages determining straight-line segmented geometric patterns and rotation of said sine-cosine potentiometer generates X and Y-axis component voltages determining a circular pattern, and switching circuit means transmitting the X and Y-axis coordinate voltages to selected connections in said second electrical circuit means to thereby provide selection of a particular one of the plurality of geometric patterns to be generated, said switching circuit means comprises a plurality of multi-position switches mechanically coupled to a second common shaft for ganged operation thereof, said multi-position switches transmitting the output voltage of said power supply means to said sine-cosine potentiometer in a first position setting of said switches to thereby generate a circular pattern upon rotation of said first common shaft, said multi-position switches interconnecting said voltage divider networks and said linear potentiometers in latter position settings of said switches for transmitting the X and Y-axis coordinate voltages to selected taps of said linear potentiometers to thereby generate the straight-line segmented geometric patterns upon rotation of said first common shaft.

7. The multi-geometric pattern set forth in claim 6 wherein said first common shaft is alternatively automatically and manually rotatable, the automatic rotation being produced by an adjustable speed electric motor driving said first common shaft in either direction of rotation, and means for disengaging the motor drive to permit takeover for manual rotation of said first common shaft in either direction of rotation.

8. A multi-geometric pattern electric generator comprising first electrical circuit means for generating a plurality of predetermined X and Y-axis coordinate voltages, said first electrical circuit means comprises means for supplying direct current electric power at a relatively constant voltage, a first plurality of series-connected resistors connected across said power supply means to form a first voltage divider network for generating the X-axis coordinate voltages, a second plurality of serially-connected resistors connected across said power supply means to form a second voltage divider network for generating the X-axis coordinate voltages, means for providing a second plurality of predetermined X and Y-axis coordinate voltages which may differ from the former plurality of coordinate voltages, multi-connection second electrical circuit means for generating X and Y-axis component voltages which determine a plurality of predetermined geometric patterns, and switching circuit means for transmitting the X and Y-axis coordinate voltages to selected connections in said second electrical circuit means to thereby provide selection of a particular one of the plurality of geometric patterns to be generated, said switching circuit means also transmitting the second plurality of X and Y-axis coordinate voltages to selected connections in said second electrical circuit means to thereby provide selection of a greater plurality of geometric patterns to be generated than with the former plurality of X and Y-axis coordinate voltages.

9. In an electron beam welding apparatus the combination of first electrical circuit means for generating a plurality of predetermined X and Y-axis coordinate voltages, multi-connection second electrical circuit means for generating X and Y-axis component voltages which when applied to the deflection coils of an electron beam welding apparatus determine a plurality of selected geometric welding patterns produced by the motion of an electron beam generated in the apparatus, switching circuit means for transmitting the X and Y-axis coordinate voltages to selected connections in said second electrical circuit means to thereby provide selection of a particular one of the plurality of geometric welding patterns to be produced, and third electrical circuit means for generating electrical signals determining controlled small excursions of the electron beam from the selected welding pattern.

10. The combination set forth in claim 9 wherein said third electrical circuit means comprises means for generating X and Y-axis voltages determining a circular pattern, and means for amplitude modulation of the circular pattern to produce successive dilation and contraction of the circular pattern.

11. The combination set forth in claim 10 wherein said third electrical circuit means further comprises means for varying the frequency of amplitude modulation of the circular pattern.

12. The combination set forth in claim 10 wherein said third electrical circuit means further comprises
means for varying the percent of amplitude modulation of the circular pattern.

13. The combination set forth in claim 10 and further including
a dual direct-current power amplifier circuit for combining and amplifying the power level of the second and third electrical circuit X-axis component voltages and for combining and amplifying the power level of the second and third electrical circuit Y-axis component voltages, and
means connected in the output of said power amplifier circuit for compensating for nonlinearity in deflection coils of the electron beam welding apparatus.

14. A puddling circuit for an electron beam welding apparatus comprising
means for providing X and Y-axis component voltages at a particular carrier frequency wherein the component voltages determine a circular pattern,
an oscillator circuit operatively coupled to said component voltage providing means for generating lower frequency than the carrier for amplitude modulation thereof,
variable resistor means connected in said oscillator circuit for generating a selected lower frequency than the carrier, and
output of said puddling circiut operatively combined with X and Y-axis component voltages determining a selected electron beam geometric pattern produced in an electron beam welding apparatus to thereby produce a controlled successive dilation and contraction of the electron beam pattern.

15. A puddling circuit for an electron beam welding apparatus comprising
means for providing X and Y-axis component voltages at a particular carrier frequency wherein the component voltages determine a circular pattern,
an oscillator circuit operatively coupled to said component voltage generating means for generating a lower frequency than the carrier for amplitude modulation thereof,
variable means connected in said oscillator circuit for varying the percent of amplitude modulation, and
output of said coupling circuit operatively combined with X and Y-axis component voltages determining a selected electron beam geometric pattern produced in an electron beam apparatus to thereby produce a controlled successive dilation and contraction of the electron beam pattern.

16. A multi-geometric pattern electric generator comprising
means for supplying direct current electric power at a relatively constant voltage,
a first plurality of series-connected resistors connected across said power supply means to form a first voltage divider network for generating a plurality of predetermined X-axis coordinate voltages,
a second plurality of series-connected resistors connected across said power supply means to form a second voltage divider network for generating a plurality of predetermined Y-axis coordinate voltages,
a first multi-tap linear potentiometer having taps spaced at equally spaced points,
a second multi-tap linear potentiometer having taps spaced at equally spaced points, said first and second potentiometers mechanically coupled to a first common shaft for ganged operation, and
a plurality of two-pole, *n*-position switches mechanically coupled to a second common shaft for ganged operation thereof, a first plurality of electrical conductors interconnecting the X-axis coordinate voltages to selected of the *n* positions associated with a first pole of said switches, a second plurality of electrical conductors interconnecting the Y-axis coordinate voltages to selected of the *n* positions associated with the second pole of said switches, a third plurality of electrical conductors interconnecting the selected positions associated with the first pole of said switches with selected taps of said first linear potentiometer to thereby transmit selected X-axis coordinate voltages to selected taps of said first linear potentiometer, a fourth plurality of electrical conductors interconnecting the selected positions associated with the second pole of said switches with selected taps of said second linear potentiometer to thereby transmit selected Y-axis coordinate voltages to selected taps of said second linear potentiometer whereby rotation of the potentiometers generates X and Y-axis component voltages determining a plurality of *n* predetermined straight-line segmented geometric patterns, and each of the *n* positions of said ganged switches provide selection of one of the *n* patterns.

17. A dual direct-current power amplifier circuit wherein each of the circuits comprises
a voltage amplifier circuit having an input terminal,
a phase inverter and amplifier circuit connected to the output of said voltage amplifier circuit,
a power amplifier circuit connected to the output of said phase inverter and amplifier circuit,
a negative feedback circuit connected from the output of said power amplifier circuit to said voltage amplifier circuit,
a variable resistor and photo-resistive cell connected in the output of said power amplifier circuit, and
an electric lamp in close proximity to said cell, said lamp connected in the output of the other power amplifier circuit whereby the two lamps of the dual circuit are connected in a criss-cross pattern to provide a compensation circuit for nonlinearity in the load of said dual amplifier circuit.

References Cited

UNITED STATES PATENTS

| | | | |
|---|---|---|---|
| 2,986,643 | 5/1961 | Brouillette | 250—202 |
| 3,004,166 | 10/1961 | Greene | 250—202 |
| 3,084,315 | 4/1963 | Coady-Farley et al. | 318—28 |

ARTHUR GAUSS, *Primary Examiner.*

S. D. MILLER, *Assistant Examiner.*